United States Patent [19]

Inui et al.

[11] Patent Number: 4,504,433

[45] Date of Patent: Mar. 12, 1985

[54] PROCESS FOR PREPARATION OF SOAP ARTICLES CONTAINING DRIED SHAPES OF SOAP

[75] Inventors: Emiko Inui; Takao Iwano, both of Osaka; Seishi Hara, Nara; Yukio Mikami, Shizuoka; Hideo Kurita, Tokyo; Yoshiaki Aoki, Kanagawa, all of Japan

[73] Assignees: Pola Chemical Industries, Inc., Shizuoka; Sanwa Chemical Industries, Inc., Ltd., Osaka, both of Japan

[21] Appl. No.: 411,069

[22] Filed: Aug. 24, 1982

[30] Foreign Application Priority Data

May 19, 1982 [JP] Japan ................................ 57-84179

[51] Int. Cl.$^3$ .......................... B29D 3/00; B29C 9/00

[52] U.S. Cl. ..................................... 264/232; 252/90; 252/134; 252/174; 252/DIG. 16; 264/247; 264/255; 264/271.1; 264/279.1

[58] Field of Search ............... 264/241, 246, 247, 250, 264/245, 255, 259, 271.1, 275, 277, 279, 279.1, 232; 252/90, DIG. 16, 134, 174, 367, 368; D28/8.1

[56] References Cited

U.S. PATENT DOCUMENTS

| | | | |
|---|---|---|---|
| 1,827,549 | 10/1931 | Villain | 264/255 |
| 3,312,197 | 4/1967 | Smith | 264/279.1 |
| 3,413,230 | 11/1968 | Dupuis | 252/174 |
| 4,081,394 | 3/1978 | Bartley | 252/174 |
| 4,116,439 | 9/1978 | Chavarria et al. | 264/250 |
| 4,182,737 | 1/1980 | Haber et al. | 264/275 |
| 4,347,270 | 8/1982 | Hart | 264/246 |

FOREIGN PATENT DOCUMENTS

| | | | |
|---|---|---|---|
| 155300 | 9/1982 | Japan | 264/255 |

*Primary Examiner*—Willard E. Hoag

*Attorney, Agent, or Firm*—Beveridge, DeGrandi & Kline

[57] ABSTRACT

A process for the preparation of soap articles containing dried shapes also formed of soap, comprises the steps of placing on the bottom of a cylindrical frame a supporting base transparent soap which has been cooled to solidification but has not been dried as yet, said base having a height lower than that of said frame; fixedly placing a dried shape(s) of colored soap on said supporting base; pouring in said frame a dough of transparent soap which may or may not be colored, and put into a molten state by heating, followed by cooling thereof to solidification; and removing the thus solidified transparent soap with said supporting base from said frame, followed by drying thereof. Instead of using the base, use may be made of one or plural needles.

5 Claims, 4 Drawing Figures

PROCESS FOR PREPARATION OF SOAP ARTICLES CONTAINING DRIED SHAPES OF SOAP

BACKGROUND OF THE INVENTION

The present invention relates to a novel process for the preparation of soap articles containing dried shapes of soap.

In the prior art, a shaped piece of soap, a printed film or the like is filled into a cake of transparent soap in the following manner. The cake of soap is divided into halves. A shaped piece of soap or a printed film is placed upon one half which is then fused at its surface to be joined to another half with the application of water or heat. Finally, another half is joined to the thus fused surface of the said one half. However, an amount of (hot) water may enter the junction of both halves during use, resulting in their separation or formation of a whitened layer on that junction.

To solve this problem, it is proposed to use adhesives. It is found, however, that the use of adhesives offers a problem in connection with safety.

SUMMARY OF THE INVENTION

A main object of the present invention is therefore to provide a novel process for the preparation of soap articles containing dried shapes of soap, which are free from the above-mentioned problems.

BRIEF DESCRIPTION OF THE DRAWINGS

The above-mentioned and other objects and features of the present invention will become apparent from a reading of the following detailed description with reference to the accompanying drawings, in which.

DETAILED DESCRIPTION OF THE INVENTION

Figure 1:
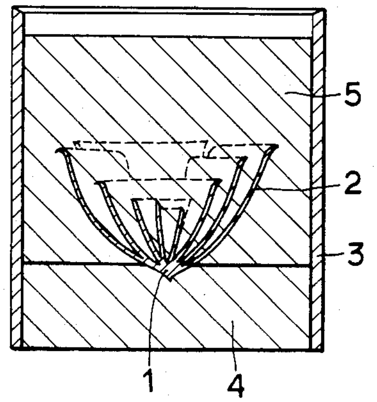
FIGS. 1 through 4 inclusive are sectional views of four (4) types of the cylindrical frames filled with transparent soap.
Figure 2:
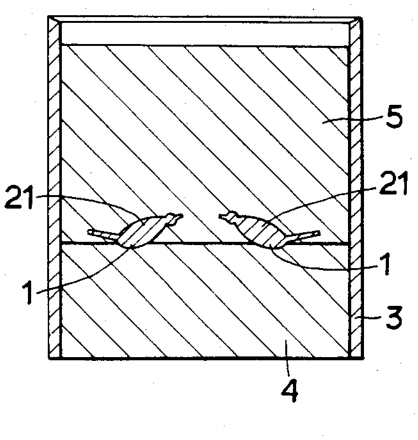

Reference will now be made to FIGS. 1 and 2. A soap base is prepared, comprising 5 to 15% by weight of sugar, 25 to 35% by weight of alcoholic compounds, 12 to 25% by weight of an aqueous matter and 58 to 25% by weight of a soap component obtained by saponification of oils and fats or higher fatty acids, etc. The alcoholic compounds may comprise 10% by weight or higher of glycerine, 60% by weight or higher of ethanol and 30% by weight or lower of one or more selected from the group consisting of ethylene glycol, polyethylene glycol, propylene glycol, polypropylene glycol, maltitol, sorbitol and a higher aliphatic alcohol. Suitable amounts of perfumes and coloring agents and, optionally, pearl pigment, are added to, and dispersed in, the soap base heated to 60° to 75° C. and fused, thereby to obtain a colored soap base to be formed into various shapes. The soap base may generally be colored in known manners by the addition of coloring materials such as dyes and pigments, or by the use of finely divided, colored synthetic resin; finely divided, colored silica gel; and microcapsules with filled-in coloring matters.

The finely divided, colored synthetic resin may be prepared by melting of a coloring material (if required, added with a pearl pigment) selected from the group consisting of suitable dyes of the tar type such as, for instance, Red No. 204, Green No. 201 and Yellow No.

403-1, natural coloring matters and inorganic pigments, and a synthetic resin such as polypropylene, polyethylene, etc. at a desired temperature, uniform milling of the resulting melt, and cooling and solidification of the thus milled paste, followed by coloring thereof in any suitable manner. Thus colored resin is finely comminuted by suitable means into an average particle size of 50 microns or less.

In another embodiment, the pores of porous silica gel spheres having a particle size of 1 to 50 microns may be impregnated with finely divided pigments inclusive of, e.g., red pigments such as iron oxide red and cadmium red, yellow pigments such as chrome yellow and yellow oxide, orange pigments such as molybdenum orange, and green pigments such as chrome green and chrome oxide. In a further embodiment, the finely divided silica gel may be impregnated with the aforesaid dyes. In a still further embodiment, use may be made of microcapsules charged therein with the aforesaid dyes as core materials.

These colored materials may be used alone or in combination, and provide a soap base to be formed into various shapes. This soap base is heated to a molten state, and poured into a cooling box having a suitable size, where it is spontaneously cooled, or forcedly cooled by suitable cooling means. After solidification, the soap base is sliced into thin films having a thickness of the order of 0.5 to 30 mm by any suitable means. These films are shaped into various types of petals and leaves by means of clicking dies of various shapes. The resulting petals and leaves are then shaped by hand into various types of flowers, the roots 1 of which are finally formed.

The thus obtained flowers 2 are preferably dried to about 50 to 70% of their original weight.

Alternatively, the soap base to be formed into various shapes is formed into the shape of a little bird by casting or embossing. By preference, the thus formed bird is also dried to about 50 to 70% of its optical weight, so that a little bird 21 formed of dried and colored soap is obtained.

Reference will now be made to the process for the preparation of soap articles containing dried shapes according to the present invention.

Suitable amounts of perfumes are added to, and mixed with, another soap base having the same composition as the foregoing soap base before drying. This second base is heated to 65° to 75° C. to form transparent liquid soap which is/is not colored. The liquid soap is cast into a cooling cylinder whose cross section is slightly smaller than that of a cylindrical frame 3 of a metallic or synthetic resin material, and is cooled either spontaneously or forcedly by means of a cooler, if required. Thus cooled and solidified transparent soap is extruded from the cooling cylinder to form a solid, transparent soap rod which is not colored. The soap rod is then treated to have a given thickness which varies with a given weight, and cut at a position sufficiently lower than that of the cylidrical frame 3 to form a supporting base 4. The base 4 is placed in the bottom of a cylindrical frame having an internal diameter only slightly larger than that of the cooling cylinder, and the said flower 2 or little bird 21 is placed on the base 4. The flower 2 or bird 21 is then fixedly embedded into the base 4. Subsequently, a given amount of liquid and transparent soap having the same composition as that of the base 4 and heated to about 65° to 75° C. is poured in the cylindrical frame 3, so that the surface of the solid and transparent soap forming the base 4 is fused by the heated transparent soap for the integration thereof. However, the flower 2 or bird 21 formed of the dry soap undergoes no fusing and transformation, and the coloring agent contained therein undergoes no exudation as well.

The poured tranparent and liquid soap is then cooled and solidified into a main body 5 of transparent soap. Thereafter, the main body 5 is removed from the cylindrical frame 3 with the base 4. The thus removed main body 5 is made smooth at its upper surface, and dried on a drying frame for 40 to 50 days which varies with its size, to 65 to 80% of its original weight. In this manner the soap product containing dried shapes of soap is obtained.

It is noted that the cross section of the frame 3 is not limited to a circular shape, and may be of a triangular, rectangular, polygonal or oval shape. In this case, the cooling cylinder is triangular, rectangular, polygonal or oval in cross section, correspondingly.

According to the present invention, the supporting base 4 having a height lower than that of the cylindrical frame 3, which is formed of the transparent soap cooled and solidified, but not dried yet, is placed on the bottom of the frame 3, the flower 2 or little bird 21 provided by drying of transparent soap is fixedly placed on the base 4, and an amount of the transparent soap heated and molten is poured and filled into the frame 3, followed by cooling thereof to solidification. Thus, the flower 2 or bird 21 can be filled into the solidified main body 5 of transparent soap at the predetermined position and in the predetermined direction without transforming or moving the flower 2 or bird 21 fixed on the supporting base 4. Accordingly, the flower 2 or bird 21 can keep its original shape without causing gasification of the alcohols contained in the heated flower or bird 21 as well as discoloration and exudation of the coloring agents contained therein.

The height of the shape 2 or 21 may be selected by varying the thickness of the supporting base 4. In order to obtain a higher flower 2 or bird 21, the thickness of the base 4 may be made smaller. Similarly, the thickness of the base 4 may be made larger to obtain a lower flower 2 or bird 21.

No separation of the lower base 4 from the upper main body 5 takes place during use, since they are integrated with each other even upon drying. The upper main body 5 and the lower supporting base 4 have an identical refractive index, since their composition is identical. This assures that the beauty of the surface of contact of both parts is not spoiled. Even when the soap-made flower 2 or bird 21 comes to the surface of the soap during use, it does not give an unpleasant feeling to the user.

Figure 3:
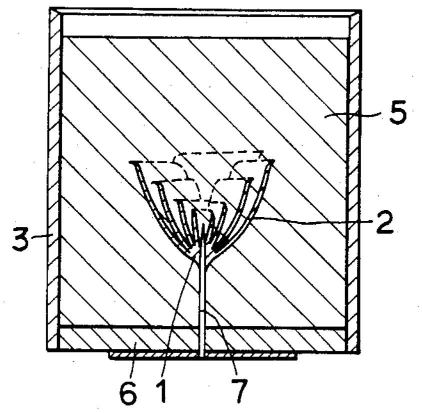
Figure 4:
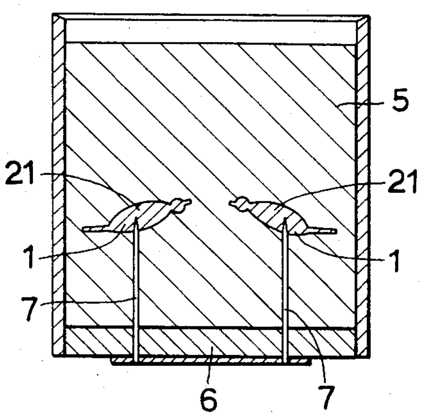

Another embodiment of the present invention will now be explained with reference to FIGS. 3 and 4.

A detachable plate 6, which is formed of a metal, synthetic resin or foamed synthetic resin, is closely fitted into the bottom of a cylindrical frame 3 similar to that of the first embodiment of the present invention. One or plural of fine needle members 7 having a pointed end(s) are inserted in the frame 3 through the bottom plate 6. The needle member(s) is formed of a metal or synthetic resin, has a given regidity, and is 0.5 to 0.2 mm in diameter. The pointed end of each needle member 7 is fixedly thrusted into the bottom of a flower 2 or bird 21 similar to those used in the first embodiment. The length of each needle 7 may be determined in dependence upon the position of the flower 2 or bird 21.

After the flower 2 or bird 21 has been fixed on the given position of the frame 3, a predetermined amount of transparent liquid soap, which is heated to 65° to 75° C. and has a composition similar to that used in the first embodiment, is poured into the frame 3, followed by cooling and solidification.

Thus obtained transparent main body 5, which is filled with the flower 2 or bird 21 formed of dried and, colored soap, is removed from the frame 3, and the needle(s) 7 is removed from the body 5. The lower end face and/or the upper end face of the solidified main body 5 of transparent soap are cut off to regulate the weight thereof as desired. The body 5 is then dried in a drying chamber for 40 to 60 days, which varies with the size thereof, to 65 to 80% of the original weight thereof. If required, the fine hole(s) remaining in the body 5 is closed up with the use of hot air or a hot iron.

According to the second embodiment of the present invention, there is provided a process for the preparation of soap articles containing dried shapes of soap which comprises the steps of inserting one or plural needle members 7 in the cylindrical frame 3 through the bottom plate 6 closely fitted into the bottom of said frame; securing a shape(s) 2 or 21 obtained by drying of a shaped piece(s) of colored soap; pouring in said frame a dough of transparent soap which may or may not be colored, and put into a molten state by heating, followed by cooling thereof to solidification; and removing the main body 5 composed of the thus solidified transparent soap and filled with said shape(s) from said frame and said needle members, followed by drying thereof.

Thus, since the flower 2 or bird 21 is secured to the pointed end of the needle 7, no floating, displacement or transformation of the flower or bird 2 or 21 takes place during pouring of molten transparent soap into the frame 3. This assures that the flower 2 or bird 21 can be set in the predetermined position. The position of the shape 2 can be adjusted by the selection of the length of the needle 7. Since the main body 5 of transparent soap, which is filled with the flower 2 or bird 21 of dried and colored soap is seamless, there is no possibility that is may separate into two layers due to the entrance of water.

The action and effect obtained in the first embodiment also hold for the second embodiment.

The present invention will be further explained with reference to the following examples, in which "%" means "% by weight".

EXAMPLE 1

24% of tallow, 14% of palm oil, 16% of a 34% aqueous solution of sodium hydroxide, 20% of ethanol, and 4% of water were heated under agitated to about 70° C. in a reactor for saponification. To the reaction product 10% of white sugar, 6% of polyethylene glycol and 6% of glycerine were added followed by mixing. Suitable amounts of coloring agents, perfumes and pearl agents were incorporated into portions of the resulting mixture to form soap bases required for forming red, pink, yellow and green petals and leaves. The respective soap bases were cast in a cooling box 20 cm in length, 4 cm in width and 10 cm in height, where they were spontaneously cooled to solidification. The thus solidified soap bases were sliced into a thickness of 0.5 to 3.0 mm by means of a plane. The sliced pieces were shaped into various types of petals and leaves by means of various clicking dies. A suitable combination of the petals and leaves were pressed at their lower ends into an undried flower which was then dried into about 70% of its original weight in a drying room. In this manner a dried flower 2 was obtained.

The above-mentioned bases were cooled to solidification in a cooling box of a suitable size. Thereafter, they were shaped into a bird or other forms by stamping, which were then dried to about 70% of its original weight in a drying room. In this manner a little bird 21 was obtained.

25% of tallow, 16% of palm oil, 21% of a 34% aqueous solution of sodium hydroxide, 23% of ethanol and 4% of water were heated under agitation to 70° C. in a reactor for saponification. To the reaction product 11% of white sugar was added followed by mixing. Suitable amounts of perfumes were incorporated into the resulting mixture to form a dough of transparent soap, which was then cast into a cooling cylinder 50 mm in inner diameter and 50 cm in length, where it was spontaneously cooled to solidification. From the cylinder, the solid soap was extruded by means of an extrusion rod, and was cut into a thickness of 1 cm to form a supporting base 4. The base 4 was then placed on the bottom of a cylindrical metal frame 3 having an inner diameter of 50.5 mm and a length of 4 cm. The flower 2 or bird 21 formed of dried soap was placed on the supporting base 4 in such a manner that it was fixedly embedded at its bottom 1 in the base 4. A dough of transparent soap of 70° C., which had the same composition as that of the base 4, was poured onto the base 4, followed by cooling thereof to solidification. Thereupon, the solidified soap was removed from the frame 3 along with the supporting base 4. The obtained main body of transparent soap was cut at its upper portion to obtain a height of 3.5 cm, and arranged on a drying frame in a drying chamber for 43-day drying, resulting in a weight loss of about 25%. Finally, the main body was polished therearound into a commercial product.

EXAMPLE 2

24% of tallow, 15% of palm oil, 19% of a 34% aqueous solution of sodium hydroxide, 20% of ethanol and 7% of water were heated under agitation to 70° C. in a reactor for saponification. To the reaction product 9% of white sugar, 1% of polyethylene glycol (1500) and 3% of glycerine were added followed by mixing. Into the resulting mixture 1% of perfumes and 1% of a coloring matter selected from finely divided, colored polyethylene having an average particle size of 50 microns or less, colored microcapsules, or colored silica gel and, optionally, suitable amounts of pearl agents, were then dispersed. As the coloring agents of the coloring matters, use was made of Red No. 204, Green No. 201 and Yellow No. 403-1. The thus obtained doughs of colored transparent soap required for forming red, pink, green and yellow petals and leaves were cast in a cooling box 200 mm in length, 40 mm in width and 100 mm in height, where they were spontaneously cooled to solidification. The solid doughs were then removed from the box, and sliced to a thickness of 0.5 to 3 mm. The sliced pieces were shaped into various types of petals and leaves by means of various clicking dies and, if required, further shaped. A suitable combination of the petals and leaves were pressed at their lower end into an undried flower, which was in turn dried in a drying room to 70% of its original weight. In this manner a dried flower 2 was obtained.

A dough of the aforesaid colored transparent soap was cooled to solidification in a cooling box of a suitable size. The solidified soap was then shaped into a bird or other forms by stamping, and dried in a drying room to about 70% of its original weight. Thus a bird 21 formed of dried and colored soap was obtained.

A styrene foam plate 6 having a thickness of 5 mm was closely fitted into the bottom of a cylindrical metal frame 3 having an inner diameter of 50 mm and a height of 55 mm. A metal needle member 7 having a length of 20 mm and a diameter of 0.3 mm was inserted through the center of the styrene foam plate 6, and fixedly thrusted at its pointed end into the flower 2 by 6 mm.

Two needle member 7 each having a length of 20 mm and a diameter of 0.3 mm were inserted into the frame 3 through the styrene foam plate 6, and fixedly thrusted at their pointed ends into two birds 21 by 5 mm. 25% of tallow, 17% of palm oil, 20% of a 34% aqeuous solution of sodium hydroxide, 23% of ethanol and 4% of water were heated under agitation to 70° C. in a reactor for saponification. Into the reaction product 10% of white sugar and 1% of perfumes were dispersed optionally with the addtion of a coloring matter. A dough of soap heated and molten at 70° C. was then poured into the frame 3 until the soap level reached 10 mm measured from its upper end, where it was spontaneously or forcedly cooled to solidification. Thereafter, the bottom plate 6 was removed from the main body of transparent soap along with the needles 7, and the main body 5 of transparent soap was removed from the frame 3. The main body 5 was cut at its upper and lower faces into a length of 35 cm. A fine hole(s) remaining in the underside of the main body 5 by removal of the needle(s) 7 was closed up by hot air or a hot iron. The main body 5 was subjected to single or several stamping, and dried in a drying chamber for 43 days, resulting in a weight loss of about 25%. Finally, the main body 5 was polished therearound into a commercial article.

What is claimed is:

1. A process for the preparation of a soap article containing an embedded dried shape also formed of soap, comprising the steps of forming a desired shape from a colored soap made from a first soap composition containing water, and drying said shape, providing a second soap composition which is a transparent soap composition containing water, placing on the bottom of frame means a supporting layer of said second soap composition which has been cooled to solidification but not dried, said transparent soap supporting layer having a height lower than that of said frame means;

placing said desired dried shape of colored soap on said transparent soap supporting layer; and fixing said dried shape on said supporting soap layer, pouring into said frame means a molten dough of said second transparent soap composition and cooling said molten dough to solidification; thereby fusing said dough with said supporting layer, there being complete integration of said layer and said supporting molten dough to prevent separation;

removing the thus solidified transparent soap including said supporting layer from said frame means, and drying said soap.

2. The process according to claim 1, further comprising said first and second soap base being essentially the same composition.

3. The process according to claim 1, further comprising forming said desired shape from a colored soap made from a first soap base and drying said shape to about 50 to 70% of its original weight.

4. A process for the preparation of a soap article containing an embedded dried shape also formed of soap, comprising the steps of:

inserting one or more needle members in a frame means through a bottom plate closely fitted into the bottom of said frame means;

forming a desired shape from a colored soap made from a first soap composition containing water, and drying said desired shape, securing said shape onto said needle member pouring into said frame means a molten dough of a second soap composition which is transparent and contains water, cooling said molten dough to solidification sufficient to prevent movement of said desired shape; and separating the thus solidified transparent soap from the said frame and said needle members, closing the hole remaining on the underside of the soap by removal of the needle by applying heat, followed by drying of said soap.

5. The process as recited in claim 1 or 4, in which the coloring material for said embedded dried shape of colored soap, is selected from finely divided, colored synthetic resin; finely divided, colored silica gel; microcapsules with filled-in coloring matters, and a mixture of two or more of these substances.

* * * * *